Oct. 13, 1964     E. W. BRINKMAN     3,152,810

COLLET CHUCK

Filed July 3, 1962

*INVENTOR.*
EARL W. BRINKMAN
BY
ATTORNEY

United States Patent Office 3,152,810
Patented Oct. 13, 1964

3,152,810
COLLET CHUCK
Earl W. Brinkman, Rochester, N.Y., assignor to Davenport Machine Tool Company, Inc., Rochester, N.Y., a corporation of New York
Filed July 3, 1962, Ser. No. 207,223
3 Claims. (Cl. 279—46)

The present invention relates to spring collets, and more particularly to an improved spring collet for use in chucks of the collet-type in which the collet is compressed to grip the work by axial movement of the collet into the bore of the chuck sleeve.

Generally a spring collet comprises a cylindrical bushing slit lengthwise from one end for a portion of its length to form a plurality of spring gripping fingers. The collet is mounted in a closing sleeve; and together collet and closing sleeve constitute a chuck. The collet is drawn axially into the closing sleeve to grip the work which is to be chucked.

One of the limitations of the conventional collet chuck is its gripping force. This determines the torque which can be transmitted through the chuck to a workpiece held in the collet. Efforts have been made to increase the gripping power by increasing the number or size of the gripping fingers formed on the collet. However, increasing the number of gripping fingers may affect the ability of the collet to center the work properly in a machine and in some cases at least also the pressure required from the closing sleeve in order to effect tight gripping of the workpiece.

One object of this invention is to provide an improved spring collet which, for a given closing pressure, will grip a piece of work with such force that more torque may be transmitted through the collet to the workpiece chucked therein than has been possible with prior such collets.

Another object of the invention is to provide a collet of the type described through which increased torque may be transmitted without increase in the closing pressure required to be exerted by the closing sleeve of the chuck.

Another object of this invention is to provide an improved collet of the type described which is relatively simple and inexpensive to manufacture.

Other objects of the invention will be apparent hereinafter from the specification, and from the recital of the appended claims, particularly when read in conjunction with the accompanying drawing.

Figure 1:
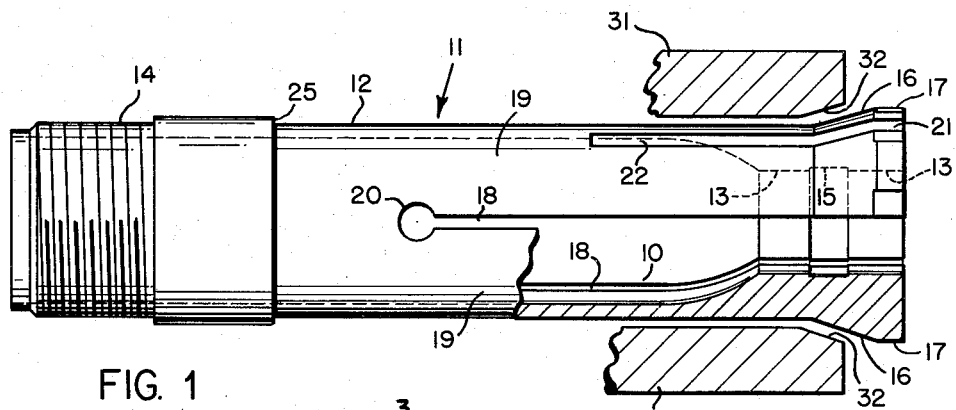
FIG. 1 is a longitudinal view, part of which is in section, of a collet made in accordance with one embodiment of this invention, and showing in section, part of the closing sleeve in which the collet is adapted to be mounted.
Figure 2:
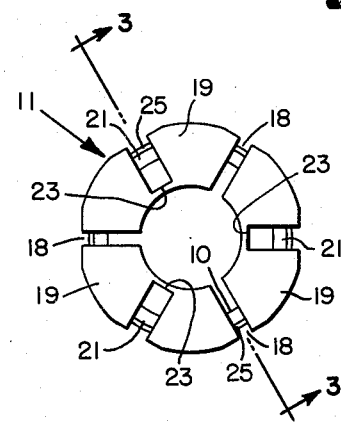
FIG. 2 is a front end view of the collet, that is, looking at the right end in FIG. 1.
Figure 3:
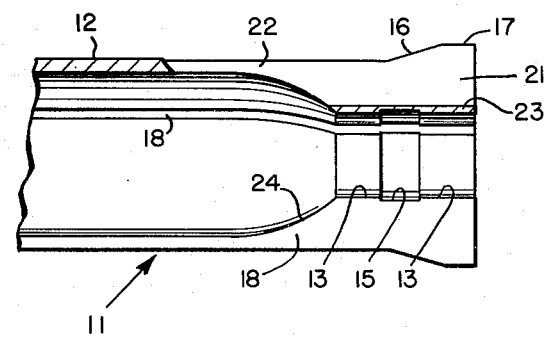
FIG. 3 is part of a sectional view taken along the line 3—3 in FIG. 2 and looking in the direction of the arrows.

Referring now to the drawing by numerals of reference, the collet 11 comprises a sleeve 12 having a bore 10 which is of gradually reduced diameter adjacent its front end, and which has at its front end a reduced inner diameter cylindrical portion 13 in which there is approximately midway of its length an internal annular groove 15. Externally the sleeve 12 has a conical surface 16 adjacent its front end and terminates at its front end in an external cylindrical surface 17 of enlarged diameter. The sleeve 12 is slit from its front end rearwardly for a major portion of its length by three equi-angularly-spaced, longitudinally extending parallel slots 18 which define three gripping fingers 19. Each of the slots 18 terminates at its rear end in a circular hole 20 which extends radially through the wall of the sleeve. Adjacent its rear end sleeve 12 has an external shoulder 25; and is externally threaded as at 14 so that it may be secured to a drawbar.

The collet thus far described is quite similar to prior spring collets. However, the collet shown differs from prior known collets in that each of the three fingers 19 is provided with an external, axially extending groove 21, milled or otherwise cut into it for an axial distance less than the axial length of a slot 18, thereby to provide in each finger 19 an axially extending cut adjacent its front end that is of a depth less than the thickness of the fingers so that a thin land 23 is left in each finger extending from the front end of the finger rearwardly to the gradually reduced diameter portion 24 of the bore of the sleeve. Each land 23 is of uniform thickness from front to rear; and its outer and inner faces are parallel to the axis of the collet. The grooves 21 run out at their rear ends into the bore of the sleeve 12 so that they become slots 22 extending through the sleeve. Each groove 21 and its communicating, aligned slot 22 are disposed substantially midway between the longitudinal lateral marginal edges of a respective finger 19. The slots 22 do not extend rearwardly of the sleeve, however, as far as the slots 18. The sleeve 12 is, therefore, divided into three major fingers 19, which are grooved longitudinally for parts of their lengths and which for other parts of their lengths are slit through.

In use, the collet is mounted in a closing sleeve, such as shown at 31 in FIG. 1. This closing sleeve has an internal bore which at its forward end has an internal conical portion 32 complementary to the external conical surface 16 of the collet. When the collet is drawn rearwardly in the closing sleeve 31 by a draw bar or the like, the conical surface 32 of the closing sleeve will cause the fingers 19 of the collet to be moved in cantilever fashion radially inwardly into gripping engagement with the particular bar or workpiece which happens to be disposed in the bore of the collet. The grooves 21 and slots 22 permit the fingers 19 to flex circumferentially about the workpiece, thereby lending to the collet 11 certain of the desired features of flexibility which would exist were the collet to be made with six rather than three fingers 19. For a given closing pressure, it has been found that applicant's collet tends to grip the bar or other piece of work in the chuck with such force that the work may be subjected to approximately 50% more torque by the cutting tool than heretofore was possible with prior collets. The lands 23, on the other hand, lend to applicant's collet the desirable feature of having only three fingers 19 movable radially relative to one another, whereby the fingers tend more readily and accurately to center a piece of work within the collet as it is moved into its gripping position in sleeve 31. Applicant's collet thus combines the radial stability which is offered by collets of the type having relatively few radially-moving gripping fingers, together with the circumferential resiliency afforded in collets of the type having numerous, radially-movable gripping fingers.

Having thus defined my invention, what I claim is:

1. A spring collet for use in a draw type collet chuck, comprising
   (a) a sleeve having a plurality of axially-extending slots through its wall extending from its front end rearwardly for less than the length of the sleeve,
   (b) said slots being angularly spaced from one another about the axis of said sleeve, and dividing said sleeve into a plurality of axially extending fingers compressible in cantilever fashion radially inwardly,
   (c) each of said fingers having in its outer surface at least one axially extending groove which extends from the front, free, terminal end of a respective finger axially rearwardly toward the rear end of the sleeve,
   (d) the axial length of said slots being equal, (e) each of said grooves having an axial length less than the axial length of said slots, (f) said grooves at the rear ends thereof communicating with further, axially extending slots formed through the wall of said sleeve and in alignment with said grooves, and (g) the overall axial length of a respective groove and of the slot aligned therewith being less than the axial length of the associated finger.

2. A spring collet for use in a draw type collet chuck, comprising (a) a sleeve having at its front end an enlarged outside diameter and a reduced inside diameter defining a relatively thick, reinforced annular wall portion at said front end, (b) said sleeve having also at said front end a plurality of axially extending equi-angularly spaced slots through its annular wall, (c) each of said slots having an axial length greater than the axial length of the reinforced portion of said sleeve and (d) said slots dividing said front end of said sleeve into a plurality of axially extending fingers compressible in cantilever fashion at their free ends radially inwardly, (e) each of said fingers having in its outer surface at least one groove extending axially along a respective finger from the free front end thereof for substantially the full axial length of said reinforced portion of said sleeve, and (f) each of said grooves having the bottom thereof disposed in a plane parallel to the axis of said sleeve and radially spaced from said axis a distance slightly greater than one half the reduced inside diameter of said sleeve, and substantially less than the radius of the enlarged outside diameter of said sleeve.

3. A spring collet as defined in claim 2 wherein (a) said grooves at the rear ends thereof communicate with axially-extending slots formed through said fingers in alignment with said grooves, and (b) the overall axial length of a respective groove and the slot aligned therewith is less than the axial length of the associated finger.

References Cited in the file of this patent
UNITED STATES PATENTS

| | | |
|---|---|---|
| 1,086,393 | Moseley | Feb. 10, 1914 |
| 2,272,185 | Chittenden | Feb. 10, 1942 |
| 2,735,688 | Duchesneau | Feb. 21, 1956 |
| 2,835,498 | Howes | May 20, 1958 |